United States Patent Office 2,729,587
Patented Jan. 3, 1956

2,729,587

PRODUCTION OF FRUCTOSE

Harold J. Koepsell, Richard W. Jackson, and Clarence A. Hoffman, Peoria, Ill., assignors to the United States of America as represented by the Secretary of Agriculture No Drawing. Application March 11, 1952,
Serial No. 276,034

4 Claims. (Cl. 195—31)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a novel method for producing and recovering fructose. It relates, particularly, to the enzymic preparation and subsequent recovery of fructose from the culture media, particularly those wherein the enzyme dextransucrase has been active.

In application Ser. No. 215,623, filed March 14, 1951, by Koepsell, Kazenko, Jeanes, Sharpe and Wilham, and application Ser. No. 256,586, filed November 15, 1951, by Tsuchiya and Koepsell, there is described a method for producing the enzyme, dextransucrase. This enzyme is elaborated by dextran-producing microorganisms, particularly *Leuconostoc mesenteroides*, or generally, organisms of the genera Leuconostoc, Acetobacter, Streptobacter, Betabacter and the like. These microorganisms, under certain cultural conditions, characteristically produce the polysaccharide, dextran. The conditions of fermentation require the presence of sucrose. In the formation of dextran, the sucrose molecule is apparently split enzymically, the fructose portion apparently being metabolized to a certain extent by the organism, whereas the dextrose portion is utilized in the synthesis of the polysaccharide.

According to the inventions described and claimed in the applications previously mentioned, there has been found that the so-called dextran-producing microorganisms of the character enumerated above may be cultivated in such a way that the enzyme, dextransucrase, may be recovered from the culture liquor. The separated enzyme may then be utilized in the purely enzymic synthesis of the polysaccharide. According to the inventions, enzyme production and recovery are accomplished by utilizing culture media containing relatively low amounts of sucrose. This method appears to afford maximum enzyme production and to permit recovery from the culture liquor. Improved yields may be obtained by carrying out the cultivation within the pH range of 6.0 to 7.0, in which case readjustment to 4.8–5.5 is desirable after production is completed in order to minimize enzyme breakdown.

According to this invention, it has been discovered that the separate, purely enzymic treatment of sucrose solutions with dextrasucrase not only results in polysaccharide synthesis, but also results in appreciable production of fructose. Thus, while very little or no fructose is recoverable from the microbiological cultures of the organisms mentioned above, the enzymic cultures result in the production of substantial quantities of this valuable sugar which are present in the culture liquor.

According to our invention, sucrose solutions are treated with dextransucrase at concentrations which may vary from as low as 2 percent up to as high as 70 grams per 100 ml. of solution. The enzyme splits the sucrose molecule and effects synthesis of the polysaccharide dextran. Dextran is recovered from the reaction medium by known methods, such as for example, alcohol precipitation. The remaining liquor, after dextran removal, is an aqueous alcoholic solution rich in fructose.

The alcohol of these liquors is evaporated and recovered by condensation, leaving an aqueous solution, rich in fructose. From this fructose-rich solution, crude or pure fructose may be recovered by any of a variety of methods. We prefer to treat the solution with the calcium ion, whereupon a calcium-fructose compound, calcium levulate, is formed which may be separated from the liquor by filtration or centrifugation. This calcium compound is then treated with a calcium ion precipitant such as carbon dioxide while suspended in water to free the fructose. The precipitated calcium compound, for example, calcium carbonate is then removed from the fructose solution, and fructose recovered by evaporation and crystallization.

The following specific examples illustrate the invention.

Example 1

Two hundred gallons of medium containing 2 percent sucrose, 2 percent corn steep liquor solids, 0.1 percent potassium dihydrogen phosphate, and traces of mineral salts, was inoculated with *Leuconostoc mesenteroides* NRRL B–512 and incubated at 25° C. During growth, alkali was added automatically as needed to maintain the pH between 6.6 and 7.0. Fermentation was completed in 11 hrs. and the culture was immediately adjusted to pH 5 to maintain enzyme stability. Bacterial cells were removed by filtration and yielded a culture filtrate containing 40 dextransucrase units per ml., where one unit is the amount of dextransucrase which will convert 1 mg. of sucrose to dextran, as determined by the amount of fructose liberated, measured as reducing power, in 1 hr.

Ten gallons of the above culture filtrate was diluted to 40 gallons with water, 33.3 pounds of sucrose was added to give a 10-percent solution, and toluene was added as a preservative. Dextran synthesis was complete before 22 hrs., and dextran was harvested at 24 hrs. by the addition of alcohol to be 40 percent on a volume basis.

The alcoholic supernatant liquor obtained was evaporated to recover the alcohol and yielded a thick syrup, rich in fructose. Analysis showed the syrup to contain 50.1 percent of reducing sugar, calculated as monosaccharide and to have an optical rotation equivalent to 35.1 percent fructose. The percentages are expressed on a weight/volume basis, and reducing power was determined by the method of Somogyi, Jour. Biol. Chem. 160, 61 (1945). A portion (4.3 liters) of the syrup was cooled to 3° C. One-tenth of this volume was treated by slow regular addition, with rapid stirring, of a 6-fold volume of cold 20 percent calcium oxide suspension. A second portion was treated in the same manner, and this process was continued until the entire volume of crude fructose syrup had been utilized. The reaction mixture became thick with a white sediment containing a profusion of microscopic needle-like crystals of calcium levulate. Stirring was continued for 2 hrs.

The calcium levulate precipitate was separated from the reaction mixture by filtration and washed with cold water. The precipitate was suspended in water to give a thick slurry, and solid carbon dioxide added until the solution was colorless to phenolphthalein. A heavy precipitate of calcium carbonate was now present and free fructose remained in the solution. The calcium carbonate precipitate was removed by filtration, and the filtered solution was found to contain 1436 g. of fructose as determined by optical rotation. A small amount of calcium bicarbonate was present as an impurity in solution and was removed by the addition of oxalic acid solution until a test for both calcium and oxalic acid was negative. The insoluble calcium oxalate precipitate was removed by filtration.

The fructose solution was decolorized by treatment with activated charcoal and concentrated under vacuum to a thick syrup. Two volumes of hot 95 percent ethyl alcohol were added, and the solution was heated to a boil and filtered to remove a small amount of insoluble material. After cooling, three volumes of ethyl ether were added, and the solution was allowed to stand overnight in the refrigerator. Fructose separated from the solution as a thick syrup and was separated from the supernatant liquid by decantation. The syrup was seeded with fructose crystals and after standing in the cold for 4 days, became a crystalline mass of fructose. The yield of dry fructose was 928 g. Additional recoverable quantities of fructose are present in the crystallization mother liquor. In continuous operation this mother liquor may be recycled for addition to subsequent quantities of fructose syrup and the combined liquors crystallized as in the foregoing example.

The procedure of the foregoing example may be varied considerably especially as to the method for recovering crystalline fructose from the enzymic conversion liquor. For example, after alcohol removal the solution may be subjected to various oxidation conditions either chemical, electrolytic, or enzymic to preferentially convert the glucose, present as an impurity, to oxidized derivatives which may be eliminated by known methods. Also, residual metallic ions or other impurities may be removed from the fructose-containing solutions during fructose recovery by ion exchange methods; for example, the calcium ion removal may be accomplished in this way. Ion exchange steps, oxidation steps and the like may be combined to afford a fructose solution which may be subjected to direct, evaporative crystallization methods for the recovery of crystalline fructose.

Instead of the calcium treatment for removal of the fructose as calcium levulate, we may substitute other metal oxides or hydroxides which form insoluble levulates.

We claim:

1. The method comprising subjecting an aqueous solution of sucrose to the action of a dextran-producing enzyme in the substantial absence of living microbial cells, separating dextran from the solution and subsequently recovering fructose from the resulting solution.

2. The method comprising subjecting an aqueous solution of sucrose to the action of a dextran-producing enzyme in the substantial absence of living microbial cells, separating dextran from the solution by the addition of ethanol and recovering fructose from the resulting solution.

3. Method of claim 1 whereby the fructose in the resulting solution is recovered by steps comprising conversion to calcium levulate.

4. In the method which comprises subjecting an aqueous solution of sucrose to the action of a dextran-producing enzyme in the substantial absence of living microbial cells and separating dextran from the solution thus formed, the improvement comprising subsequently recovering fructose from the resulting solution by steps comprising conversion of the fructose to an insoluble levulinate.

References Cited in the file of this patent

UNITED STATES PATENTS 2,392,258   Owen ------------------ Jan. 1, 1946

OTHER REFERENCES

Evans et al.: Bacterial Polysaccharides (reprint from adv. in Carbohydrate Chemistry, vol. II, Academic Press), Scientific Report Series, No. 6, Sugar Research Foundation, Inc., N. Y.; April 1947; article, pages 203–233; pages 211, 216, 217 relied upon.

Hehre et al.: Jour. Bact. 55 (1948), pages 197–208; pages specifically relied upon are 204–205.